(12) United States Patent   (10) Patent No.: US 12,345,328 B2
Hardin                          (45) Date of Patent:   Jul. 1, 2025

(54) METHODS AND SYSTEMS FOR IMPROVING THE OPERATION OF TRANSMISSIONS FOR MOTOR VEHICLES

(71) Applicant: David A Hardin, El Monte, CA (US)

(72) Inventor: David A Hardin, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 443 days.

(21) Appl. No.: 17/828,272

(22) Filed: May 31, 2022

(65) Prior Publication Data

US 2023/0383838 A1   Nov. 30, 2023

(51) Int. Cl.
*F16H 61/02* (2006.01)
*F16H 61/00* (2006.01)

(52) U.S. Cl.
CPC ..... *F16H 61/0251* (2013.01); *F16H 61/0021* (2013.01); *F16H 2061/0062* (2013.01); *F16H 2061/0253* (2013.01)

(58) Field of Classification Search
CPC ............. F16H 61/0251; F16H 61/0021; F16H 61/0206; F16H 61/142; F16H 2061/0062; F16H 2061/0253
See application file for complete search history.

(56) References Cited

U.S. PATENT DOCUMENTS

| | | | |
|---|---|---|---|
| 4,449,426 A | 5/1984 | Younger | |
| 4,711,140 A | 12/1987 | Younger | |
| 4,790,938 A | 12/1988 | Younger | |
| 5,253,549 A | 10/1993 | Younger | |
| 5,540,628 A | 7/1996 | Younger | |
| 5,624,342 A | 4/1997 | Younger | |
| 5,730,685 A | 3/1998 | Younger | |
| 5,743,823 A | 4/1998 | Younger | |
| 5,768,953 A | 6/1998 | Younger | |
| 5,820,507 A | 6/1998 | Yomaer | |
| 5,967,928 A | 10/1999 | Younger | |
| 6,099,429 A | 8/2000 | Younger | |
| 6,117,047 A | 9/2000 | Younger | |
| 6,179,107 B1 * | 1/2001 | Hall, III | G05D 16/2024 137/596.16 |
| 6,287,231 B1 | 9/2001 | Younger | |
| 6,390,944 B1 | 5/2002 | Younger | |
| 6,565,472 B1 | 5/2003 | Younger | |
| 6,699,157 B2 | 3/2004 | Younger | |
| 6,729,989 B2 | 5/2004 | Younger | |

(Continued)

*Primary Examiner* — Patrick C Williams
(74) *Attorney, Agent, or Firm* — Mark P. Stone

(57) ABSTRACT

The hydraulic circuitry of the factory installed automotive automatic transmission of the General Motors Corporation identified as the Allison 1000 and 2000 Series is modified to include a new return spring to decrease clutch pressure and mainline pressure so as not to exceed a predetermined pressure to reduce the time to complete an upshift, to replace the main regulator valve spring to increase main line pressure at road speed based on road conditions, and to provide a new valve with an internal exhaust circuit operatively associated with the TCC (Torque Converter Clutch) to lower balance circuit pressure resulting in the increase of converter clutch apply pressure. The methods and systems for modifying the factory installed transmissions improve the overall operation and efficiency of the transmission during operation of the motor vehicles in which the transmissions are installed.

4 Claims, 5 Drawing Sheets

(56) References Cited

U.S. PATENT DOCUMENTS

| | | |
|---|---|---|
| 6,814,680 B2 | 11/2004 | Younger |
| 6,871,397 B2 | 3/2005 | Younger |
| 6,913,554 B2 | 7/2005 | Younger |
| 6,964,628 B2 | 11/2005 | Younger |
| 7,128,679 B2 | 10/2006 | Younger |
| 7,331,893 B2 | 2/2008 | Younger |
| 8,221,288 B2 * | 7/2012 | Long ................. F16H 61/12 137/557 |
| 9,429,228 B2 | 8/2016 | Younger |
| 9,970,534 B2 | 5/2018 | Younger |
| 10,724,628 B2 | 7/2020 | Hardin |
| 10,948,059 B2 | 3/2021 | Hardin |
| 11,105,415 B2 | 8/2021 | Hardin |
| 2003/0188946 A1 * | 10/2003 | Jackson ............. F16H 61/143 192/3.29 |
| 2005/0075207 A1 * | 4/2005 | Younger ........... F16H 61/0021 475/116 |
| 2005/0272549 A1 * | 12/2005 | Carne ................ F16H 57/04 475/116 |
| 2010/0229969 A1 * | 9/2010 | Ishikawa ............ F16H 61/12 137/511 |
| 2015/0089934 A1 * | 4/2015 | Richards ............ F15B 1/027 60/393 |

* cited by examiner

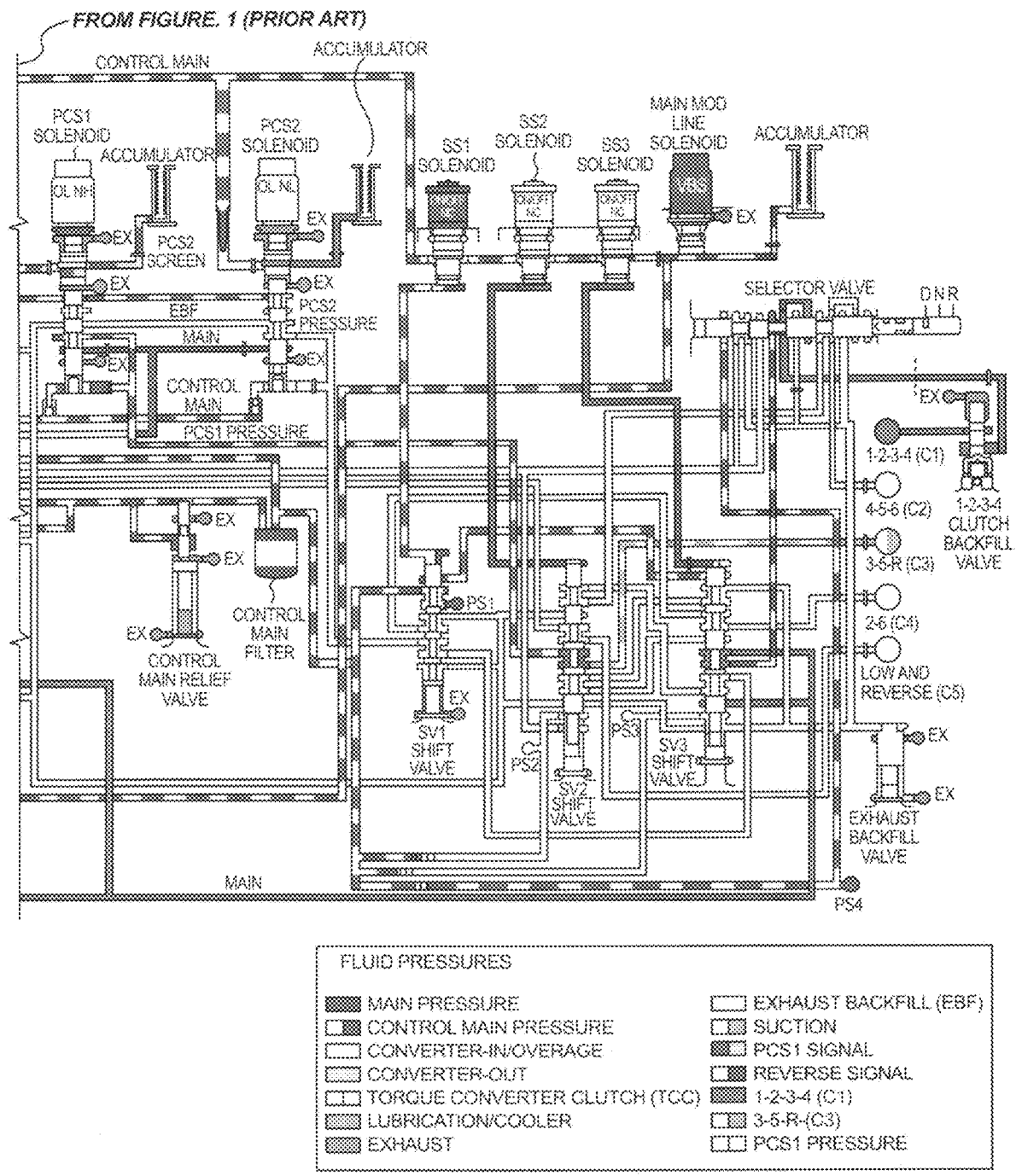
FIGURE 1 (CONTD)
(PRIOR ART)

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of automatic transmissions for automotive vehicles, more commonly referred to as "factory installed" transmissions, installed in automotive vehicles by an original motor vehicle manufacturer. The invention is more particularly directed to improvements to the "factory installed" hydraulic circuitry of automotive transmissions designated as the Allison 1000 Series and 2000 Series installed in vehicles manufactured by General Motors Corporation of Detroit, Michigan.

Operation of the aforementioned "factory installed" automatic automotive transmission is well known to, and within the knowledge of, persons skilled in the relevant art of automotive transmission operation and design. Descriptions and illustrations of this "factory installed" automotive transmissions, including the operation thereof, are found in a publication of the General Motors Corporation identified as "Principles of Operation-2021 September PO7137EN-Allison Transmission-Allison 5th Generation Controls-Allison 6th Generation Controls-1000 Series and 2000 Series", the entire subject matter of which is hereby expressly incorporated by reference herein.

It is the primary objects of the present invention to modify the hydraulic circuitry of the factory installed transmission to decrease the time required to complete upshifts, to increase main line pressure at road speed to increase the ability of the transmission to hold with added engine torque, and to increase TCC (Torque Converter Clutch) pressure to increase the ability of the torque converter clutch to hold with added engine torque.

SUMMARY OF THE INVENTION

In accordance with the present invention, the hydraulic circuitry of the factory installed General Motors automatic automotive transmission identified as the Allison 1000 and 2000 Series is modified: to replace an existing return spring with a new return spring calibrated so as to decrease clutch pressure and mainline pressure so as not to exceed a predetermined pressure to reduce the time to complete an upshift; to replace the existing main regulator valve spring with a new main regulator valve spring calibrated so as to increase main line pressure at road speed based on road conditions; and to provide a new valve with an internal exhaust circuit operatively associated with the TCC (Torque Converter Clutch) Solenoid to lower balance circuit pressure resulting in the increase of converter clutch apply pressure.

BEST MODES FOR CARRYING OUT THE INVENTION

Figure 1:
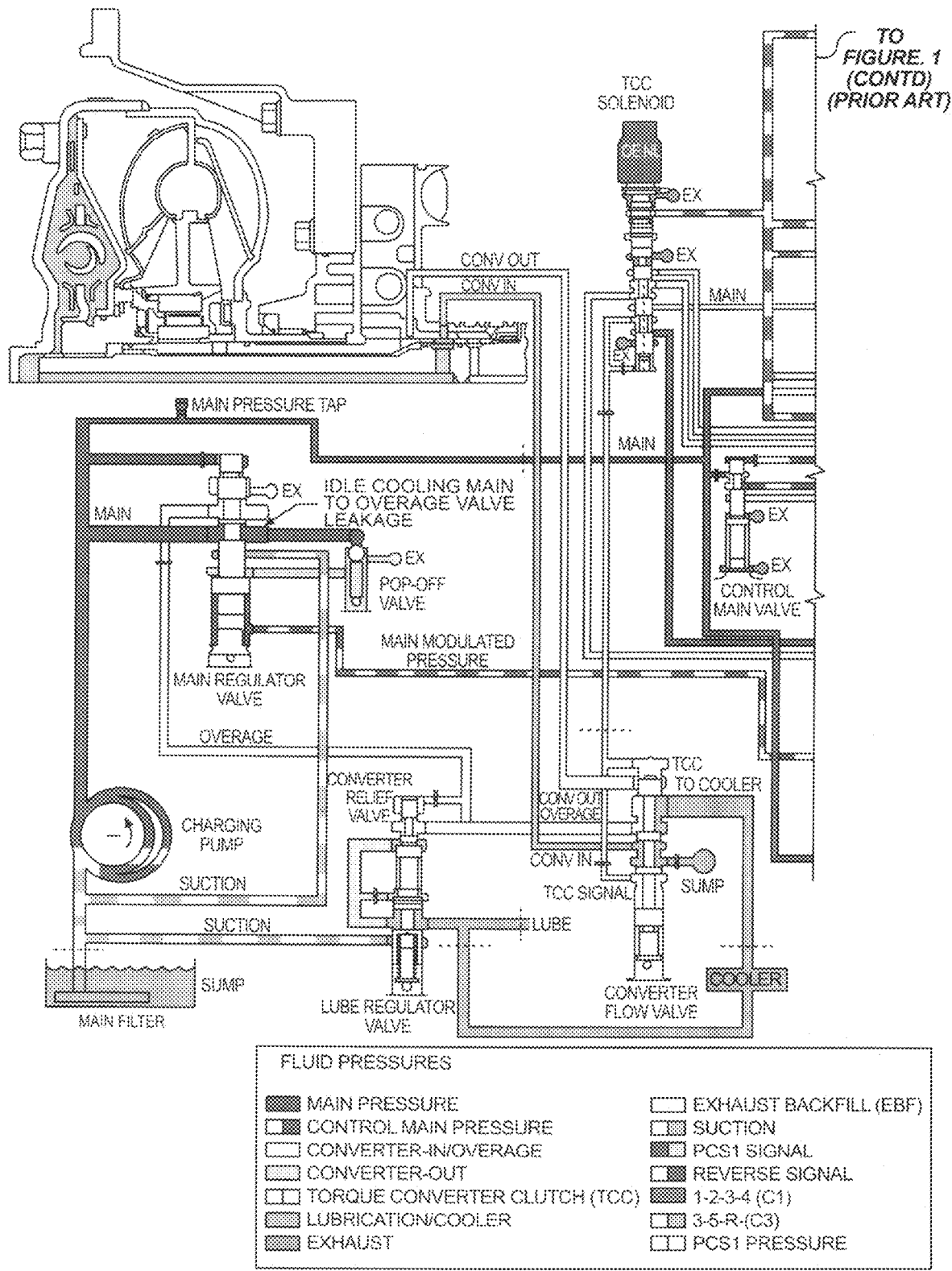
FIG. 1 illustrates the hydraulic circuit of a "factory installed" Allison Transmission installed in vehicles manufactured by General Motors Corporation of Detroit, Michigan, which is subject to the modifications in accordance with the present invention.

Referring to FIG. 1 of the drawing, the hydraulic circuitry of the "factory installed" automatic automotive transmission identified as the Allison Transmission 1000 Series and 2000 Series of the General Motors Corporation is illustrated. Operation of this hydraulic circuitry is known to, and within the knowledge of, persons skilled in the automotive transmission art, and is also disclosed and illustrated in the aforementioned publication "Principles of Operation-2021 September PO7137EN-Allison Transmission-Allison 5th Generation Controls-Allison 6th Generation Controls-1000 Series and 2000 Series".

The object of the present invention is to improve the operation of the "factory installed" transmission in three separate ways, namely, to modify the hydraulic circuitry of the factory installed transmission to decrease the time required to complete upshifts; to increase main line pressure at road speed to increase the ability of the transmission to hold with added engine torque; and to increase TCC (Torque Converter Clutch) pressure to increase the ability of the torque converter clutch to hold with added engine torque.

Figure 2:
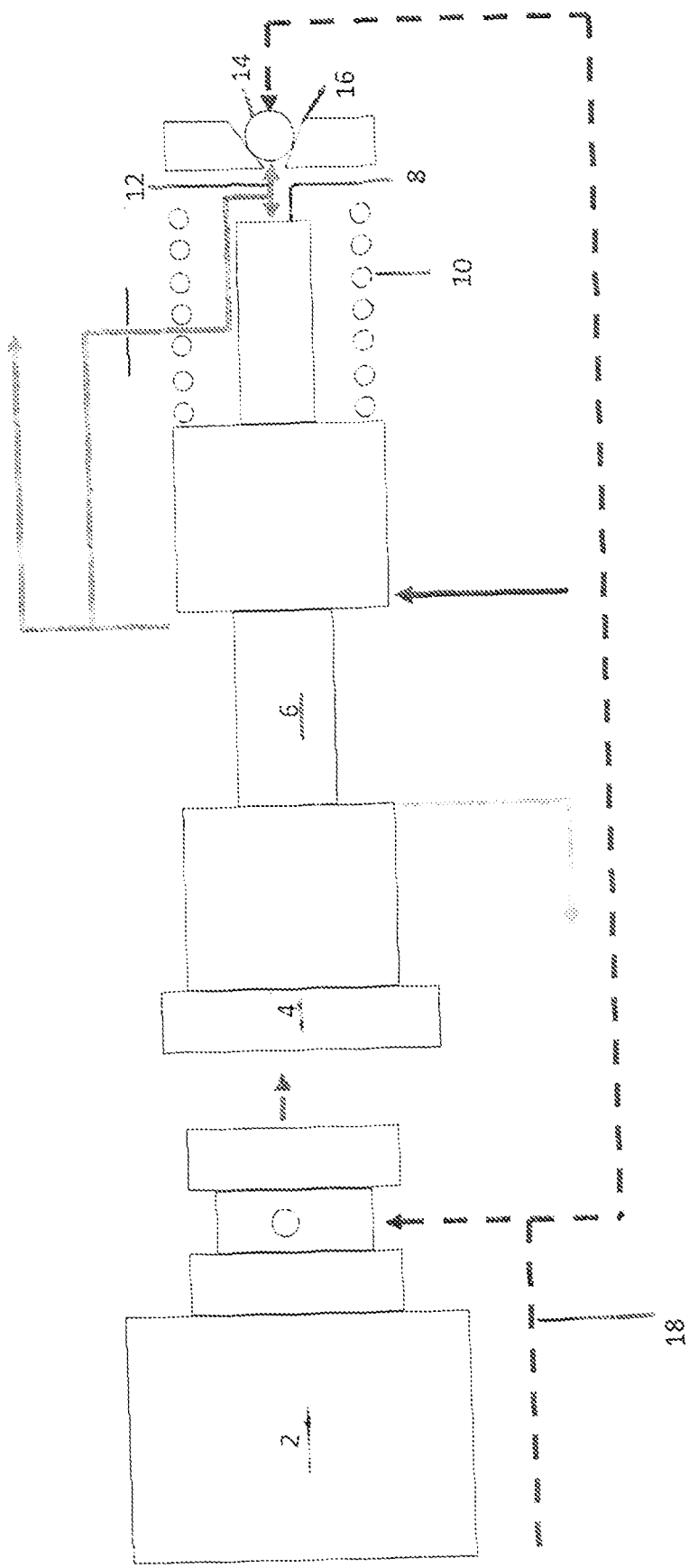
FIG. 2 is an isolated view of a portion of the hydraulic circuitry shown by FIG. 1 illustrating one of the modifications to the hydraulic circuit illustrated by FIG. 1 in accordance with the present invention.

FIG. 2 of the drawing illustrates the first modification made to the "factory installed" hydraulic circuit illustrated by FIG. 1 in accordance with the present invention, namely to decrease upshift times.

Reference numeral 2 designates a Pressure Control Solenoid (PCS1 &2) which controls shifting of the transmission. When the PCS solenoid 2 is commanded to apply a clutch pressure by the onboard computer in the vehicle (not shown), it increases the clutch apply pressure from 0 psi (pounds per square inch) to a maximum of 94 psi over a period of time between about 1.2-1.4 seconds. This applied pressure is transferred to the 0.595 inch diameter land 4 of the trim valve 6 so that a rightward force is applied to the trim valve moving the trim valve in a rightward direction as shown in FIG. 2 to start the clutch apply.

On the opposite end 8 (the balance end) of the trim valve 4, the force moving the trim valve in the rightward direction is opposed by a spring 10 and incoming clutch oil pressure designated by reference numeral 12 applied to the balance end 8 of the trim valve. This allows the vehicle onboard computer through the PCS solenoid 2 to increase the clutch apply pressure from 0 to approximately 103 psi over a time period of about between 1.2-1.4 seconds.

When this occurs, a check ball 14 is unseated from its seat 16, thereby limiting balance oil pressure to 103 psi, the same pressure as the control main pressure designated by reference numeral 18. Any further increase in the clutch apply pressure by the solenoid 2 moves the trim valve 4 fully to the right as shown by FIG. 2, allowing clutch oil pressure to equal control main pressure.

To achieve this goal, the spring 10 on the control main regulator valve of the factory installed transmission is changed/replaced with a spring to lower main control pressure to 75 psi. Accordingly, the vehicle onboard computer now controls oncoming clutch apply pressure from 0-75 psi. Thereafter the check ball 14 is unseated from the seat 16 and allows the oncoming clutch pressure 12 to equal the main pressure, resulting in a decrease of the shift apply time from about 1.2-1.4 seconds time to about 0.6 to 0.7 seconds, which results in significantly faster upshifts.

Figure 3:
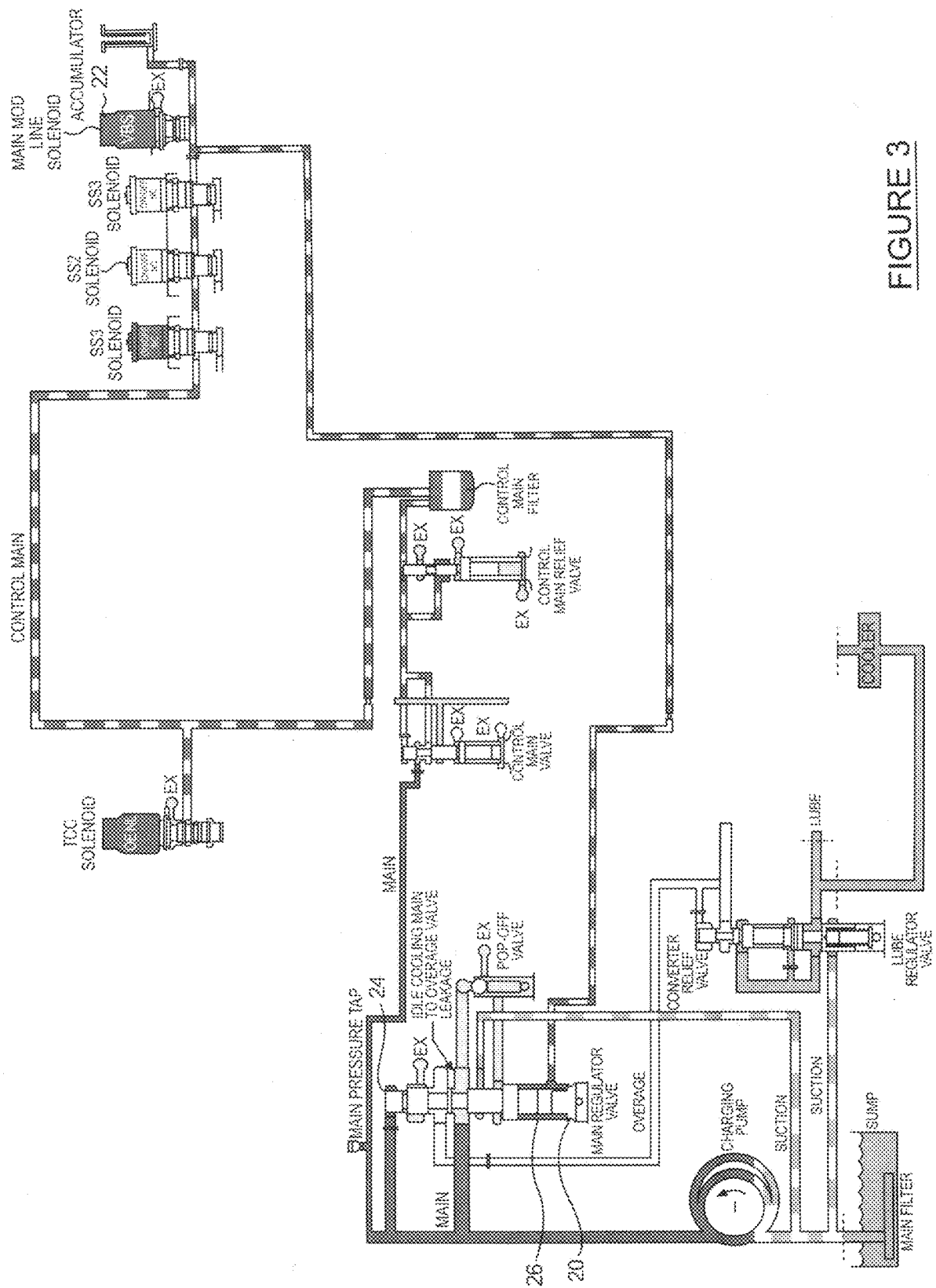
FIG. 3 is an isolated view of another portion of the hydraulic circuitry shown by FIG. 1 illustrating another of the modifications to the hydraulic circuit illustrated by FIG. 1 in accordance with the present invention.

FIG. 3 of the drawing illustrates the second modification made to the "factory installed" hydraulic circuit illustrated by FIG. 1 in accordance with the present invention, namely to increase main line pressure at road speed.

A main regulator valve 20 controls transmission pressure and responds to commands from a vehicle onboard computer through the main mode line solenoid designated by reference numeral 22.

The balance end 24 of the main regulator valve 20 has a diameter of 0.560 inches and an area of 0.246301 inches. The main regulator valve also includes a 14.750 pound spring designated by reference numeral 26, resulting in a minimum line pressure of 59.8 pounds per square inch (psi). The onboard vehicle computer with up to 83 psi of main mode line solenoid pressure can raise line pressure from 59.8-267.1 psi based on driving conditions.

In accordance with the present invention, the main regulator valve spring 26 of the "factory installed" transmission is replaced with a 20 lb spring. This spring replacement results in a minimum line pressure of 81.2 psi, and not 59.8 psi.

The onboard vehicle computer with up to 75 psi of main mode line solenoid pressure, which results from the modification discussed with regard to FIG. 2, can raise line pressure from 81.2-268.5 psi based on driving conditions. This allows a 22 psi gain throughout the pressure rise curve over the factory installed transmission without raising maximum line pressure.

As a result of this modification, 4th, 5th or 6th upshifts will run at 172 psi at road speed, while the maximum main line pressure of the factory installed transmission is limited to 150 psi.

Accordingly, the modifications to the factory installed transmission as discussed with respect to FIGS. 2 and 3 of the drawings enables the modified transmission to decrease shift times and to increase main line pressure above that of the factory installed transmission when the vehicle is traveling at road speed.

Figure 4:
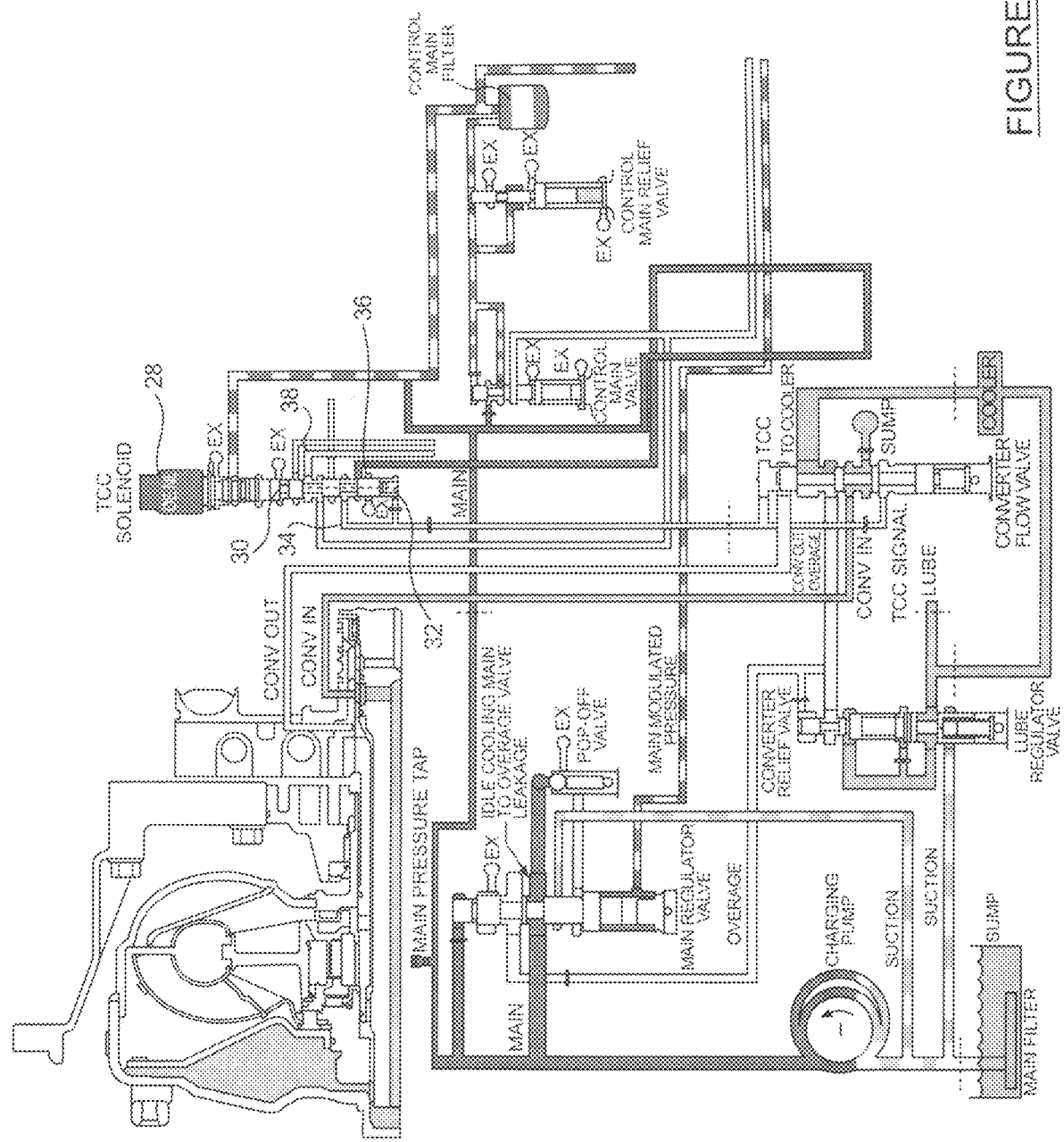
FIG. 4 is an isolated view of yet another portion of the hydraulic circuitry shown by FIG. 1 illustrating yet another of the modifications to the hydraulic circuit illustrated by FIG. 1 in accordance with the present invention.

FIG. 4 of the drawing illustrates the third modification made to the "factory installed" hydraulic circuit illustrated by FIG. 1 in accordance with the present invention, namely to increase the TCC (Torque Converter Clutch) apply pressure.

When the TCC solenoid designated by reference numeral 28 is commanded to apply the converter clutch by a vehicle onboard computer, it increases the applied pressure from 0 psi to a maximum of 100 psi over a period of time between about around 1.2-1.4 seconds. This pressure is transferred to the 0.527 inch diameter end 30 of the TCC valve to generate a downward force to move the TCC valve in a downward direction as shown in FIG. 4 to start the clutch apply.

A spring 32 on the opposite end of the TCC valve exerts a resilient force opposing the downward movement of the TCC valve. An orifice 34 is provided in a line in communication with the TCC valve for applying orificed clutch oil on the 0.425 inch diameter balance end 36 of the TCC valve.

TCC solenoid pressure from 0-100 psi can generate converter clutch apply pressure from 0-127 psi as a result of the difference between the diameters of the lands 30 and 36 of the TCC apply valve.

Control main pressure is applied to the TCC solenoid 28 (which has already been lowered to 75 psi as a result of the modifications discussed with respect to FIG. 2) to further lower converter apply pressure to a maximum of 88 psi.

In accordance with the present invention, a calibrated exhaust circuit designated by reference numeral 38 is provided in fluid communication with the balance orifice 34 to cooperate with the balance orifice 34 to lower the balance circuit oil pressure and to raise the converter clutch apply pressure.

With this modification to the TCC valve, and with the modification to the transmission discussed with respect to FIG. 2 to set main control pressure at 75 psi, the converter clutch pressure can be controlled from between 0-150 psi.

It is apparent from the discussion herein, the modifications to the factory installed transmission each make significant improvements to the operation thereof, and preferably all three modifications are implemented together to result in an overall system improvement to the operation of the entire transmission.

The discussion of the best modes for carrying out the invention made herein is intended to be illustrative only and not restrictive of the scope of the invention, that scope being defined by the following claims and all equivalents thereto.

The invention claimed is:

1. A method of modifying a factory installed automatic automotive transmission having a solenoid controlled by a vehicle onboard computer for applying pressure to a first end of a trim valve for moving said trim valve in a first predetermined direction, a factory installed return spring applying a resilient force to a second opposite end of the trim valve to oppose said movement of the trim valve in said first predetermined direction, a check ball seated in a seat for controlling balance oil pressure applied to said second end of said trim valve for further opposing said movement of said trim valve in said first predetermined direction, wherein the steps of said method include:

replacing said factory installed return spring with a different return spring having a spring characteristic which controls main pressure of the hydraulic circuit to not exceed a predetermined value less than the main pressure of the factory installed transmission for decreasing the time for completing an upshift to a predetermined range of time less than that of the automatic automotive factory installed transmission;

said factory installed automatic automotive transmission further including a main mode line solenoid in fluid communication with a main regulator valve, and a factory installed main regulator valve spring arranged to exert a resilient force on a balance end of the main regulator valve, wherein the steps of said method further include:

replacing said factory installed main regulator valve spring with a different main regulator valve spring having a spring characteristic which raises main mode line solenoid pressure to a predetermined value exceeding that of the factory installed automatic automotive transmission based on driving conditions.

2. The method as claimed in claim 1, wherein the step of selecting the return spring includes selecting the return spring so that main line solenoid pressure is raised above 150 pounds per square inch based on driving conditions.

3. The method as claimed in claim 1, wherein the step of selecting the return spring includes selecting the return spring so that main line solenoid pressure is selected to control main pressure of the hydraulic circuit so that the range of time to complete an upshift is between 0.6-0.7 seconds.

4. The method as claimed in claim 1, wherein said predetermined value of said main mode line solenoid pressure is above 150 pounds per square inch.

\* \* \* \* \*